Dec. 2, 1958 A. E. CRAVER 2,862,303
METHOD FOR DRYING FILMS
Original Filed Sept. 7, 1951
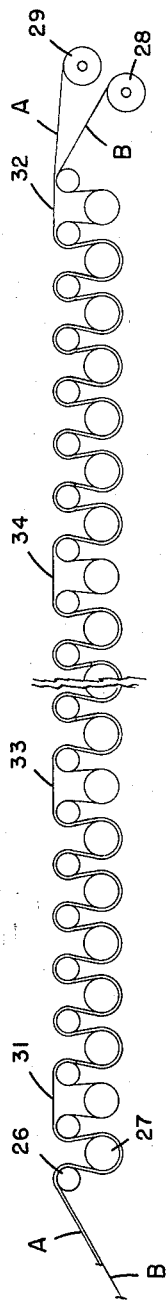
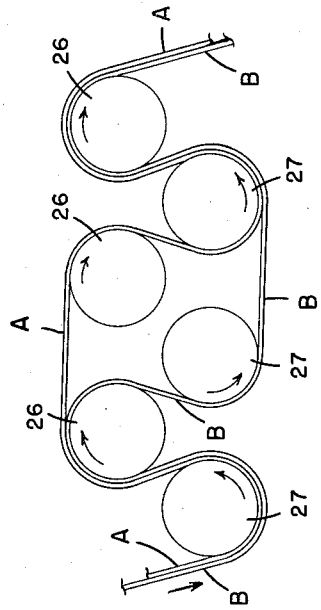
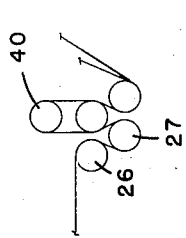
INVENTOR.
AUGUSTUS E. CRAVER
BY Thomas B O'Malley
ATTORNEY

United States Patent Office 2,862,303
Patented Dec. 2, 1958

2,862,303

METHOD FOR DRYING FILMS

Augustus E. Craver, Fredericksburg, Va., assignor to American Viscose Corporation, Philadelphia, Pa., a corporation of Delaware Original application September 7, 1951, Serial No. 245,612. Divided and this application March 3, 1953, Serial No. 340,075

1 Claim. (Cl. 34—41)

This invention relates to methods for simultaneously drying a plurality of films. This application is a division of copending application Serial No. 245,612, filed September 7, 1951.

This invention has for an object to provide methods for simultaneously drying a plurality of films.

Other objects and advantages of the invention will be apparent from the following description and the accompanying drawing.

In the drawing,

Figure 1 is a side view of a form of apparatus in which is diagrammatically shown a procedure for drying a plurality of films on a single drier embodying the present invention.

Figure 2 is a side view of another embodiment showing a modification of the manner in which a plurality of films may be separated during the drying operation.

Figure 3 is an enlarged view diagrammatically showing another modification of the manner in which a plurality of films may be separated during the drying operation.

In this invention, film forming material is extruded through slit-like nozzles positioned in the same coagulating bath or each positioned in a separate bath, and the plurality of at least partially coagulated films are brought together with their adjacent surfaces in contact with each other. They are then simultaneously passed through the various conventional coagulating and/or regenerating, washing, desulfurizing, bleaching, and softening baths in sinuous paths. While passing upwardly or downwardly through the baths, the films may be separated by guide means or the like so that for a portion of their travel while passing through a bath and while emerging therefrom or while entering a bath and passing through the bath for a portion of their travel, the films are spaced apart, and the separation of the films permits the bath to contact both sides of each film and permits the discharge of vapors and gases that are formed between the films. The films after being subjected to the various liquid after treating baths are then dried by passing the plurality of films over a plurality of heated rolls or the like. The plurality of films positioned with their adjacent surfaces in contact with each other are directed together over and around the drying rollers in a sinuous path. To remove water vapor that is formed between the films and to prevent cementing of the films together, as soon as the films reach the temperature of the drying rollers and water vapor is being formed between the films, the films are separated for a short distance to permit the escape of the water vapor. This separation also permits the films to shrink width-wise independently of each other and prevents wrinkling and straining of the films. The films are then placed together with adjacent surfaces in contact with one another, and the films are directed over the drying rolls to the end of the drying means. The films are separated adjacent the end of the drying means and are each separately directed to wind-up rolls. To remove further water vapor as it is formed, the films may be separated a plurality of times as they pass through the drying means between the separation zones referred to adjacent each end of the drying means.

The apparatus and process of this invention are applicable to the production of two or more films simultaneously from various coagulable film-forming hydrophilic colloids such as, for example, viscose, aqueous solutions of cellulose in inorganic or organic solvents such as zinc chloride, cupra ammonia, organic amines and the like, also water-soluble and alkali-soluble cellulose ethers, gelatin, casein, and water-soluble vinyl acetate and polyvinyl alcohol and the like. The expression "film" as used above and hereinafter is intended to include any of these classes of materials all of which are capable of being coagulated in the form of a continuous film from their aqueous dispersions.

Film forming material, such as viscose or the like, is extruded through nozzles into coagulating baths where the film forming material is at least partially coagulated in the form of films A and B. The at least partially coagulated films are then directed simultaneously through the successive coagulating and/or regenerating, washing, desulfurizing, bleaching, and softening baths.

The films after being subjected to the various liquid treatments are then passed to a drying means which comprises a plurality of heated upper and lower rolls or the like 26 and 27. The films together are passed over and around the upper and lower rolls in a sinuous path until at least one of the films reaches the temperature of the heated rolls and water vapor is being formed between the films. In a preferred procedure, the films contain approximately 70 to 75% moisture at this position. The films are then separated as shown at the location 31 by passing the upper film A directly across a pair of the upper rolls 26 skipping the adjacent lower roll 27 while the lower film B goes around that adjacent lower roll 27. The films are then positioned together and passed over and around the rolls to a position adjacent the end of the drying means indicated by reference character 32. The films are then separated by passing the upper film A directly across a pair of the upper rolls skipping the adjacent lower roll 27 while the lower film B goes around that lower roll 27. The films are separately wound up on the take-up rolls 28 and 29. To insure the removal of the vapors that are formed between the films, blower means or the like may be provided with means to direct heated air between the separated films to remove vapor from between the films. In order to remove vapors that are formed between the films as the drying of the films continues, the films may also be separated at additional places along the length of the drying means as shown by reference characters 33 and 34. In a preferred practice of the invention, the films are also separated between the first and last separation positions when the films contain from approximately 50 to 55% moisture, approximately 25 to 30% moisture, and again when the films contain from approximately 8 to 12% moisture.

Instead of separating the films by having one of the films skip one of the rollers as described above, an additional drying roller such as heated roller 40 shown in Figure 2, may be provided which is positioned above the other rollers. With this arrangement, the upper film A, after passing around a lower roller 27, is passed upwardly and around the roller 40. The lower film is passed around the roller 26 so that the films are spaced apart between the rollers 40 and 26. The films are then positioned together and passed around the lower roller 27.

In Figure 3 is shown diagrammatically another manner of separating the films on the drying means which results in more uniform drying. In this arrangement the upper film A skips a lower roll 27 and passes directly over to the adjacent upper roll while the lower film B in approximately the same position along the drying means skips an upper roll 26 and passes over to the adjacent lower roll 27. Both portions of the films that are separated are spaced apart by the same amount and each is free from the heated rolls for approximately the same distance. Blower means or the like may be provided for removing vapors that have formed between the films and the same lengths of each of the films are subjected to this vapor-removing procedure.

The separation of the films during the drying procedure removes vapor that would otherwise collect between the films and facilitates the drying of the films; also separating the films prevents or lessens the tendency of the films to be cemented together. Further, as the films shrink widthwise during the drying step, the films are able to shrink independently of each other in the zone in which they are separated. This prevents the formation of strains or wrinkles in the films which would otherwise be caused by one film tending to shrink and being restrained by contact with the other film.

While preferred embodiments of the invention have been shown, it is to be understood that changes and variations may be made without departing from the spirit and scope of the invention as defined in the appended claim.

I claim:

The method of drying a plurality of films comprising directing upper and lower films together over a plurality of upper and lower drying rolls at least some of which are heated, passing the films alternately over and under upper and lower drying rolls, separating the films from each other by passing the upper film directly over a pair of adjacent upper drying rolls and the lower film in the same region directly and simultaneously under a pair of adjacent lower drying rolls, and positioning said films together after said separation with their adjacent surfaces in contact with each other.

References Cited in the file of this patent

UNITED STATES PATENTS

| | | |
|---|---|---|
| 2,285,290 | Lang | June 2, 1942 |
| 2,622,340 | Veyret | Dec. 23, 1952 |